Dec. 6, 1966  R. C. EHLING  3,289,346
FISH HOOK
Filed July 30, 1964
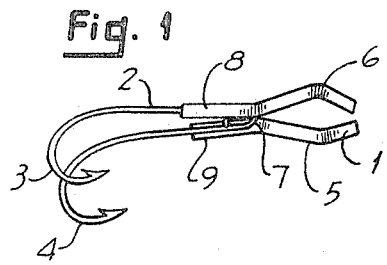
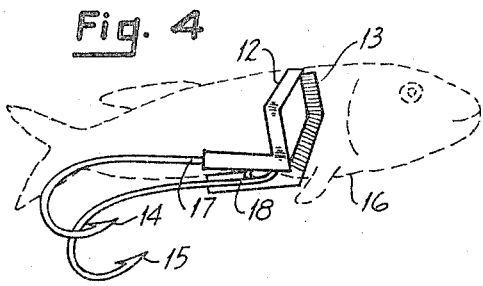
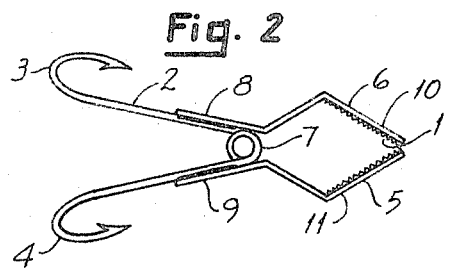
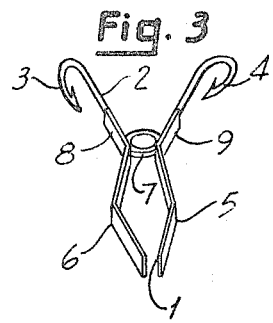
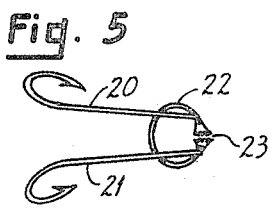
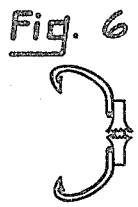
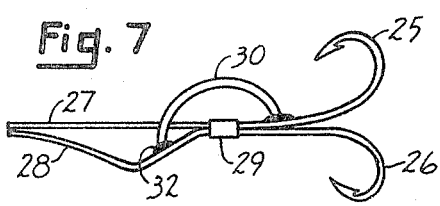
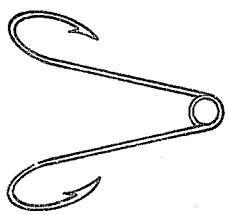
INVENTOR.
ROBERT C. EHLING
BY
ATTORNEY

United States Patent Office 3,289,346
Patented Dec. 6, 1966

3,289,346
FISH HOOK
Robert C. Ehling, 187 Spring Brook Trail, Sparta, N.J.
Filed July 30, 1964, Ser. No. 386,244
4 Claims. (Cl. 43—44.6)

This invention relates to fish hooks in general and is particularly directed to fish hooks capable of securely retaining live bait in various sizes, forms, kinds and degrees of position or orientation and keeping it alive indefinitely.

Fish hooks in general are provided with hook means for hooking bait, generally alive, but because of the impaling and goring effect in attaching the bait to the hook, the bait in time dies thus destroying its effectiveness as a lure. Further, bait in the form of insects cannot be used by such hooks because of the damage created in attaching such insects to such hooks. It is to be appreciated that live bait, because of its natural effect in water, creates the greatest lure and attraction for fish and therefore the greatest chance of success in hooking them becomes apparent.

Since fishing is a sport, the natural tendency to participate therein is enhanced when the degree of ease in participation is increased. Hooking bait is a chore at times because of the care required in impaling the bait to assure its remaining alive for a long period of time. However, in doing so one may injure himself because of the movement of the bait, and also the elements may not be favorable to accomplishing such hooking chores. Also where there is absent of sufficient light, such as nighttime, and where there is severe cold, the handling of live bait becomes quite impossible.

In hooking bait, many times the bait is damaged or destroyed and more bait has to be supplied. Further, since hooked bait remains alive for a relatively short period of time, it must be continually replaced thus increasing the time and cost in this replenishment process.

To avoid these shortcomings and others, what is contemplated is the construction of a double spaced apart fish hook, part of which is spring coiled, and which has attached thereto a pair of jaw-like members held in compressive contact by spring action and separated by the forceful movement of the hooks towards each other against the compressive forces of the spring action opposing such motion. The jaw-like members are disposed to be interchanged with different sized and shaped jaw members thus facilitating and accommodating different sizes and kind of bait. The jaw members themselves may be hooks or workable members suitable to modification by the user in the field.

It is therefore a principal object of the invention to provide an improved type of fishing hook.

Another object of the invention is to provide a fishing hook for accommodating live bait and maintaining said bait in a live and animated state over extended periods of time.

Another object of the invention is to provide a fish hook which can simply and easily accommodate live bait of various sizes, forms, kinds and degrees.

Another object of the invention is to provide a fish hook which can accommodate live bait simply, quickly and under adverse conditions and provide a degree of safety to the user.

Another object of the invention is to provide a fish hook which is economical, easily handled, efficient, provides savings on bait and establishes a high degree of lure to the fish.

Further objects and advantages will become apparent from a reading of the specification and a study of the accompanying drawings and wherein;

FIGURE 1 shows in perspective the fish hook according to the invention;

FIGURE 2 shows an elevational view of the fish hook in FIGURE 1;

FIGURE 2a shows the fish hooks and spring element as one continuous member;

FIGURE 3 shows another view of the fish hook in FIGURE 1;

FIGURE 4 shows the fish hook of FIGURE 1 with the jaws oriented in a direction substantially at right angles to the direction of the hooks;

FIGURE 5 shows another embodiment of the invention;

FIGURE 6 is an end view of FIGURE 5;

FIGURE 7 is still another embodiment of the invention.

Now referring to the drawings and in particular to FIGURES 1–3 there is shown therein a fish hook 1 comprising a fish hook body 2 having a pair of hook points 3 and 4 each connected to hook jaws 5 and 6, respectively, at their extremities remote from the hook point. The hook points 3 and 4 are the extremities of the hook body which is spring coiled 7 in the middle or along the body. The said spring coiled portion of the body 7 is holding the hooks in spaced relation under the compressive forces of said spring action. Mounted to the hook members are a pair of collar-like hook jaw extension members 8 and 9 each forming extensions of jaw members 6 and 5, respectively, and disposed to receive in snug-like fashion the hook body member 2 so that the extended jaws will open in response to the movement of the coiled spring portion 7 of the hook body. The collars are each constructed so as to receive and conveniently hold snugly in place various sized and shaped jaw members, the said jaw members being easily removed therefrom and replaced with different sizes. The jaw members may also be fastened directly to the hook body by means of a weld or metal joining process and without the use of collars 8 and 9.

As shown in the said FIGURES 1–3, the hooks and jaws are each co-extensive and so arranged about the coiled spring portion of the hook body that compression of the hook points 3 and 4 will permit the jaws 5 and 6 to open against the compressive force of coiled spring portion of the body 7 which is disposed to urge the closing of the jaws, once the compression of the hooks is removed. The jaw extremities 10, 11 remote from their point of attachment to spring portion 7 may or may not have on their inner surfaces serrated tooth-like members to permit better gripping of the bait and the retention thereof when the jaws, under compressive urging of the coiled spring portion are closed.

In FIGURE 4 there is shown a modification of the fish hook shown in FIGURES 1–3 in that the jaw members 12, 13 instead of being co-extensive with the hook body and attaching collars, are extended in a direction at substantially 90 degrees therefrom and opposite to the pointed elements of the hook. By permitting the jaws 12, 13 to extend in this manner and direction the live bait 16 may be held in a position which is co-extensive with the hooks 17, 18 and thereby permit less exposure of the hook portion of the overall fish hook.

Another embodiment of the invention is shown in FIGURES 5 and 6 and comprises a pair of hook bodies 20, 21 attached to an open-loop spring-like member 22, the opening 23 thereof being placed remote from the hook bodies opposite their pointed ends. The compression or bringing together of the hook bodies, against the tensile stresses of the loop 22 permits the opening 23 to expand considerably to receive live bait and to retain same under the influence of the tensile stresses created by the loop-member 22. Although the loop 22 as shown is of a given size, it may be appreciated that various sized loops having different degrees of tensile capabilities may be used and that the attachment thereof is merely a matter of providing suitable attachment device onto the hook bodies.

There is shown in FIGURE 7 still another embodiment of the invention and in particular shows a pair of hook bodies 25, 26 which combine both hook and jaw features in a single structural member. In the instant embodiment the hook bodies 25, 26 have their jaws 27, 28 co-extensive and integral with the said bodies. The bodies 25, 26 are juxtaposed and centrally clamped together by collar member 29, so that their jaw extremities are closed. The jaws are closed because of the tensile force created by semi-loop 30, whose extremities 31, 32 are attached to bodies 25, 26, respectively, on opposing sides of the collar, on the said bodies. The jaw members 27, 28 can be manually opened to enable them to receive bait.

From the foregoing it can be appreciated that various changes in form and design can be made without detracting from the scope and intent of the invention.

Having defined the invention what is claimed is:

1. A fish hook comprising,
    (a) a plurality of spaced hook body members, each having hook portions at one end,
    (b) tensile means providing a pivotal connection for said members connected to the other end of said members to undergo compression in response to compressive movement of said hook portions,
    (c) jaw members for receiving bait,
    (d) said jaw members including means detachably receiving said hook body members, said jaw members extending oppositely said pivotal connection with respect to said last named means,
    (e) said tensile means comprising a coil spring whose ends are co-extensive and integral with said hook body members.

2. A fish hook according to claim 1 and wherein the said jaw members include irregular surfaces for enhancing the gripping and holding of bait.

3. A fish hook according to claim 2 and wherein the said irregular surface has a serrated configuration.

4. A fish hook according to claim 1 and wherein the said jaw members extend at an angle with respect to said means detachably receiving said hook body members.

References Cited by the Examiner

UNITED STATES PATENTS

| 2,425,587 | 8/1947 | Zuravsky | 43—44.6 |
| 2,659,996 | 11/1953 | Hegler | 43—44.6 |
| 2,775,058 | 12/1956 | Roberts | 43—44.4 |
| 2,940,208 | 6/1960 | Oswald | 43—44.6 |

FOREIGN PATENTS

| 53,152 | 10/1933 | Norway. |

ABRAHAM G. STONE, *Primary Examiner.*

SAMUEL KOREN, *Examiner.*

R. L. HOLLISTER, *Assistant Examiner.*